Sept. 7, 1937.  R. CHILTON  2,092,639
GEAR MEANS FOR ELIMINATING A MASTER CONNECTING ROD
Filed April 28, 1936  3 Sheets-Sheet 1

INVENTOR.
R. CHILTON
BY
ATTORNEY.

Sept. 7, 1937.   R. CHILTON   2,092,639
GEAR MEANS FOR ELIMINATING A MASTER CONNECTING ROD
Filed April 28, 1936   3 Sheets-Sheet 2
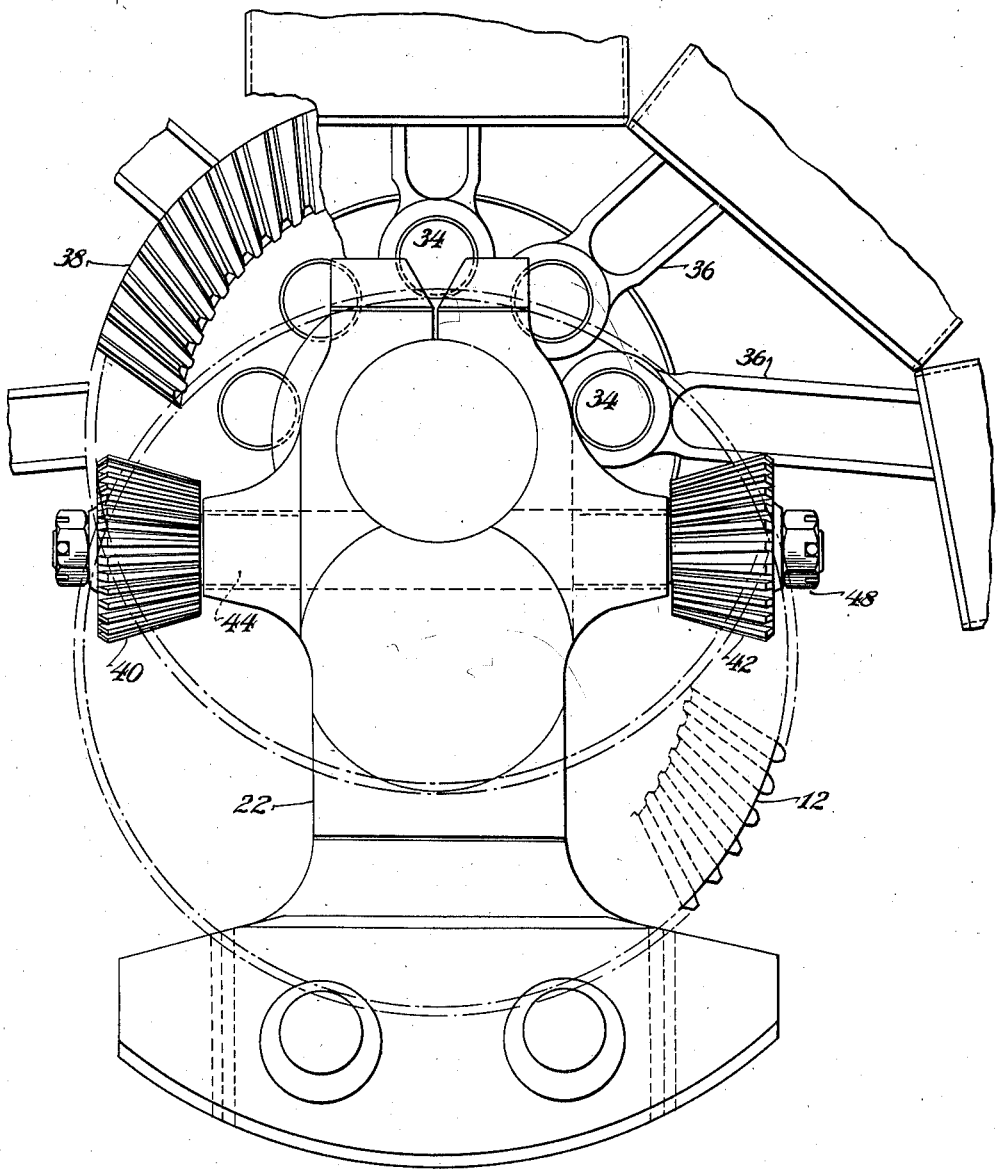
INVENTOR.
R. CHILTON
BY
ATTORNEY.

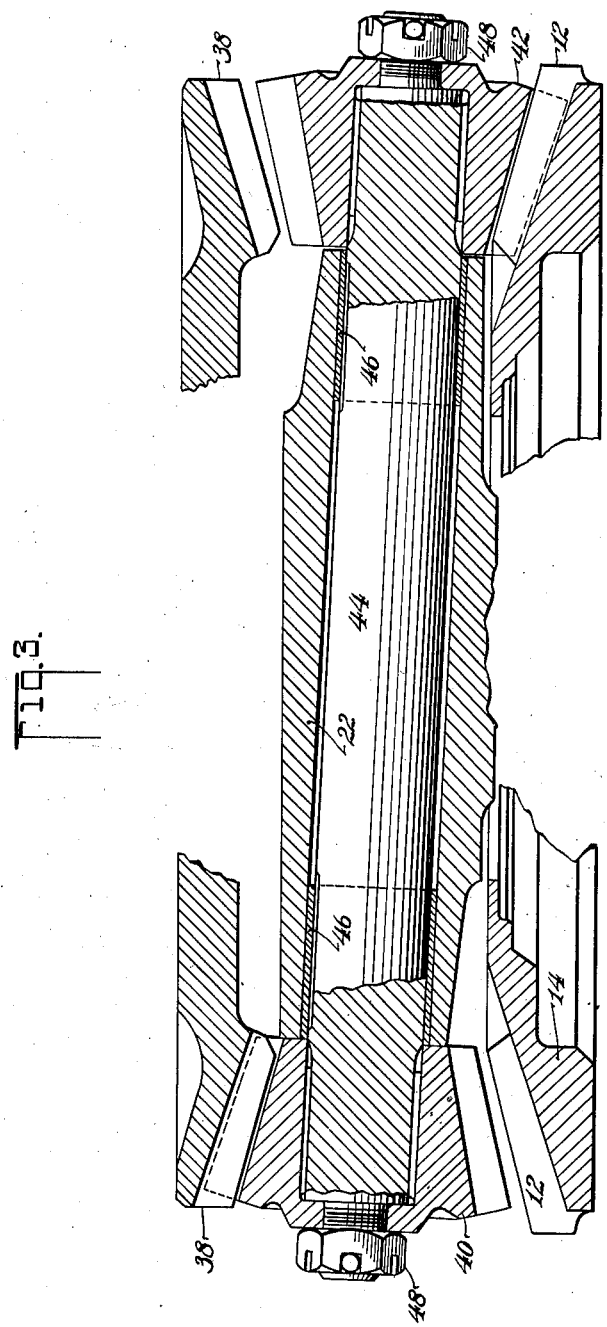

Patented Sept. 7, 1937

2,092,639

UNITED STATES PATENT OFFICE 2,092,639

GEAR MEANS FOR ELIMINATING A MASTER CONNECTING ROD

Roland Chilton, Ridgewood, N. J., assignor to The Reed Propeller Co., Inc., a corporation of New York Application April 28, 1936, Serial No. 76,766

5 Claims. (Cl. 121—120)

This invention relates to connecting rods for engines wherein a plurality of rods cooperate with a common crankpin.

A prime object of the invention is to overcome disadvantages found in the conventional arrangements as follows: The well-known master-and-link rod construction for radial engines sets up unsymmetrical piston movements and accelerations due to the angularity of the master rod. This angularity gives an elliptical path to the various knuckle pins, the degree of ellipticity being greatest on the knuckle pins on the side remote of the master rod shank. These variations from symmetrical piston motion give rise to undesirable unbalanced forces; set up errors in the piston stroke relationship and greatly increases the maximum angularity of the link rods, thereby increasing the piston side pressures.

Accordingly, the present invention aims in overcoming all these effects and in providing a new and improved structure wherein all of the knuckle pins have a true circular motion.

Other objects will be obvious from, or will be pointed out in the following description with reference to the drawings, in which:

Fig. 2 is a fragmentary end view; and

Fig. 3 is a fragmentary plan view in section on the line 3 of Fig. 1.

Figure 1:
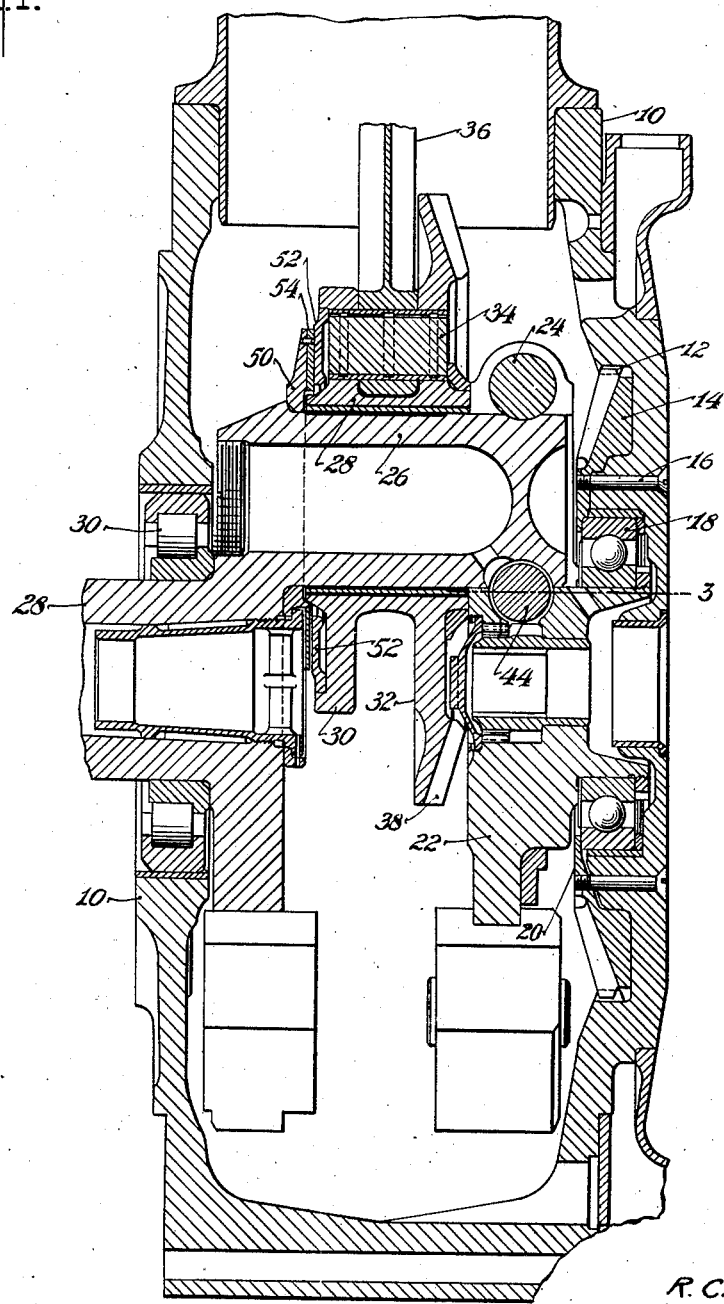
Fig. 1 is a section through the crankshaft axis of a radial engine incorporating the invention.

Referring first to Fig. 1, 10 designates a crankcase which is conventional except that it is equipped with internal splines or teeth 12 engaged by corresponding teeth on a fixed hypoid bevel gear 14 additionally secured by screws 16 which also serve to secure a crankshaft rear ball bearing 18 by means of an extension flange 20 of the gear 14, the latter being concentric with the crankshaft journals.

Supported in the bearing 18 is a crankshaft rear member 22 having a usual clamp joint including a clamp bolt 24 with a crankpin 26 integral with a front crankshaft section 28 supported in a front bearing 30 as usual.

In place of the conventional master rod, there is rotatably mounted on the crankpin 26 a crankpin member 28 comprising a spool having flanges 30, 32 provided with suitable holes for equally spaced knuckle pins 34 on which articulate conventional link rods 36. Formed integral with the right-hand flange 32 of the spool 28 is a bevel gear 38 which is a companion to the fixed bevel gear 14 but which is concentric with the crankpin. These gears are of hypoid tooth form as shown in Fig. 2 and are respectively engaged by bevel pinions 40, 42 splined on projecting ends of a cross shaft 44 carried in bushings 46 in a cross bore formed in the rear crank member 22, the pinions being secured axially by suitable nuts 48 as shown. It will be noticed, in the plan section view of Fig. 3, that the cross shaft is slightly angulated from a normal axial relation with the crankshaft so that the pinion 40 meshes with the connecting rod spool gear 38 but clears the fixed gear 14, while the companion pinion 42 meshes with the fixed gear 14 but clears the connecting rod gear 38.

The crankshaft is located axially with respect to the fixed gear 14 by the ball bearing 18, while the crankpin spool 28 is located axially by a thrust plate 50 cooperating with a companion thrust plate 52 carried by the spool 28, a suitable thrust bearing disc 54 being interposed. Thus, the axial thrust reactions of the bevel gears and pinions are resisted by equal and opposite thrust forces at the ball bearing 18 and the thrust bearing comprising the elements 50, 52, 54.

These pinions comprise a 1:1 planetary driving connection between the fixed gear 14 and the connecting rod gear 38. The action may be visualized by imagining the crankshaft held from rotation and the gear 14 freed from its fixed anchorage and rotated, whereupon it will be seen that the same direction and amount of rotation of the gear 14 will be communicated to the gear 38. Thus, since the gear 14 is in fact locked from rotation, the connecting rod gear 38 is likewise held from rotation upon the crankpin axis in spite of the fact that it has a circular orbital motion on that axis. In other words, if the device be assembled with the upper knuckle pin 34 vertically above the crankpin center, this knuckle pin remains vertically above the crankpin center throughout its orbital motion. Thus, any vertical line on the crankpin member 28 remains vertical in all positions of the crankshaft; all the knuckle pins have a purely circular path and each of the link rods have a symmetrical motion with respect to their individual cylinder axes, whence the maximum angularities of the link rods are identical and are substantially smaller than with a conventional master rod.

Due to manufacturing tolerances, deflection of the parts, and bearing wear, the orbital radius of the connecting rod spool is not an exactly determinable quantity. In general, as the connecting rod bearing wears, and as increase in speed increases the centrifugal load, there is a tendency for this orbital radius to increase and it is an important feature of the gear organization of this invention that such increase is permitted without imposing additional loads on the gears. This self-adjusting characteristic is not inherent in certain rotating link schemes of the prior art where it has been found necessary accordingly to give the links freedom to extend, which somewhat complicates the structure and results in the entire turning moment of the spool being resisted by one link at a time, although a relatively large multiplicity of links must be used to ensure smooth action.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a crankpin, of a spool member rotatable thereon, a plurality of knuckle pins carried by said member, a connecting rod engaging each knuckle pin, a hypoid bevel gear secured to said spool, a companion gear held from rotation concentric with the center of rotation of said crankpin, a cross shaft supported for rotation with the crankpin, and bevel pinions rotatable with said cross shaft and engaging respective hypoid gears.

2. The combination with a crankshaft having a crankpin, of a crankpin member, a plurality of connecting rods articulated to said member, a bevel gear organized for rotation with said member, a companion gear held from rotation on the crankshaft axis, a shaft and hypoid pinions drivably connecting said gears and organized for bodily rotation with said crankshaft.

3. The combination with a shaft having a crankpin, a cross shaft carried by said shaft, a bevel pinion on each end of said cross shaft, bevel gears concentric respectively with said crankshaft and crankpin, and a connecting rod member rigid with the crankpin gear the latter being meshed with one of said pinions, said non-rotating gear concentric with said crankshaft being meshed with the other of said pinions.

4. In an engine, in combination, a crankcase including a crank shaft bearing, a crankshaft supported in said bearing and having a crankpin, a connecting rod member rotatable on said crankpin, a bevel gear secured to said member, a bevel gear secured to said crankcase, pinions meshed with respective gears and a cross shaft connecting said pinions and carried by said crankshaft.

5. The combination with a crankpin bearing member and a crankcase member, of bevel gears secured to respective members, a crankshaft, a cross shaft carried by the crankshaft, and bevel pinions on the cross shaft engaging the respective gears.

ROLAND CHILTON.